May 12, 1970     L. MACKTA     3,511,569

METHOD AND APPARATUS FOR DETERMINING VELOCITY OF MOVING OBJECTS

Filed Sept. 6, 1966     3 Sheets-Sheet 1

INVENTOR.
LEO MACKTA

BY

ATTORNEY

May 12, 1970     L. MACKTA     3,511,569
METHOD AND APPARATUS FOR DETERMINING VELOCITY OF MOVING OBJECTS
Filed Sept. 6, 1966     3 Sheets-Sheet 2
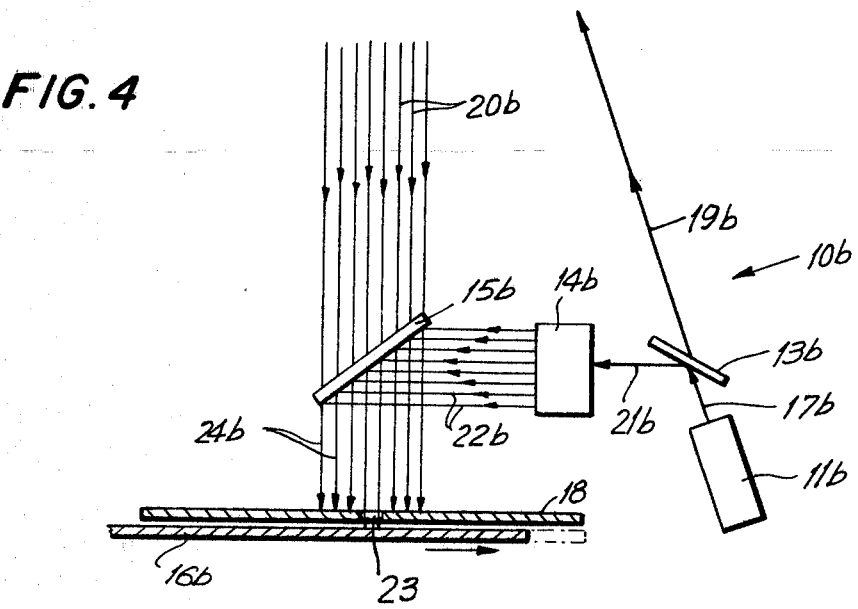
FIG. 4
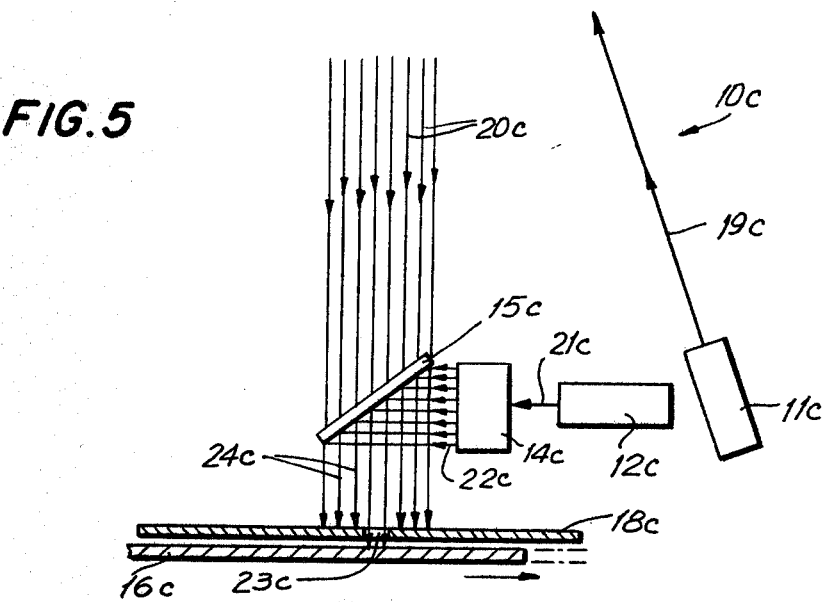
FIG. 5
FIG. 6
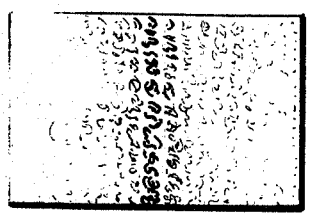
INVENTOR.
LEO MACKTA
BY
*Jackson L. Lilling*
ATTORNEY

United States Patent Office 3,511,569
Patented May 12, 1970

3,511,569
METHOD AND APPARATUS FOR DETERMINING VELOCITY OF MOVING OBJECTS
Leo Mackta, 444 Beach 132nd St., Belle Harbor, N.Y.
Filed Sept. 6, 1966, Ser. No. 577,458
Int. Cl. G01p *3/36*
U.S. Cl. 356—28          30 Claims This invention relates generally to methods and apparatus for determining the speed of moving objects. More particularly, it relates to the methods and apparatus for determining velocity by making and recording or reading holograms of moving objects.

It is a known fact that a moving object will reflect beams of light of varying frequency. The frequency is changed in accordance with the well known Doppler shift. Further, by determining the change in frequency of the beam reflected by such object, one can determine the velocity of such object.

One method for determining the shift or change in frequency of a beam reflected from a moving object is to direct a beam of known frequency at the subject object and then measure or determine the frequency of the reflected beam. A laser or monochromatic beam of light, also referred to as coherent light, is a light source of determinable constant frequency.

As is already known, a hologram is a recording of the phase and amplitude pattern obtained when coherent light is reflected from or transmitted through an object and is caused to interfere with a reference beam of coherent light. The recording thus made contains all the information necessary for the reconstruction of the image of the object, and this can be done by viewing the hologram in the illumination of coherent light.

In the formation of a hologram, the reference light and the light from the object are generally from the same source, separated by prisms or partially silvered mirrors, partially reflecting and partially transmitting, so that they are of the same frequency, and will thus produce a stationary pattern to be recorded as the hologram.

Accordingly, it is an object of this invention to describe a means for determining the component of velocity of an object in a radial direction from the observer, by means of altering the frequency of the reference light during the formation of the hologram pattern. When the altered reference frequency is the same as that reflected from the moving object, a stationary hologram pattern will be obtained, while if the two frequencies do not correspond, a blurring of the hologram will obtain so that no sharp pattern will be formed.

Likewise, if the parts of an object are moving at different speeds relative to the observer, as when in rotation, or if different objects are moving at different speeds, a hologram pattern will be obtained only for that part or that object which reflects light of a frequency which is the same as that of the reference frequency. All the other parts or objects will simply produce a constant background level of light over the area of the hologram. Upon reconstruction of that image, only those parts or objects which were moving at the proper velocity would be observed.

The recording of the hologram may be made either photographically, on film, or, upon the sensitive cathode of a television type image orthicon tube.

Accordingly, it is another object of this invention to provide a unique apparatus and highly advantageous method which will be extremely versatile, being capable of recording a hologram by various methods and apparatus.

Another important object of this invention is to provide a method and apparatus for identifying an object moving at a specific or known velocity, thus to be able to select that object out of a background of different objects moving at different velocities.

It is a further object of this invention to provide a method and apparatus that may be used for determining the velocity of an object which may be at a relatively short distance from the observer as well as for determining the velocity of an object that may be at a relatively great distance from the observer.

It is another object of the present invention to provide apparatus of the type described which is relatively simple, thus obviating the need for more complex and expensive equipment, and which will effect substantial savings in capital expenditure as well as in its installation, maintenance and overhead costs.

It is a further object of the present invention to provide a uniquely advantageous method for determining the velocity of a moving object, which is capable of many varied applications, thus making it possible to achieve these objects by the use of relatively inexpensive equipment and with an efficiency, accuracy and economy never before obtainable.

Other objects of the present invention will become apparent upon reading the following specification and referring to the accompanying drawings, which form a material part of this disclosure.

The invention accordingly consists in the features of construction, combinations and arrangements of parts and method steps, which will be exemplified in the following description and of which the scope will be indicated by the appended claims.

In the drawings:

FIG. 4 is a diagrammatic representation illustrating an alternate embodiment of the apparatus of FIG. 1 as employed in a method of the invention for producing a series of holograms, at different frequencies of the reference beam, on a single photographic plate;

FIG. 5 is a diagrammatic representation illustrating an alternate embodiment of the apparatus of FIG. 2 as employed in a method of the invention for producing a series of holograms, at different frequencies of the reference beam, on a single photographic plate;

FIG. 6 is a diagrammatic representation illustrating conceptually the appearance, under a normal light, of a hologram made with the apparatus of either FIG. 4 or 5;

Figure 1:
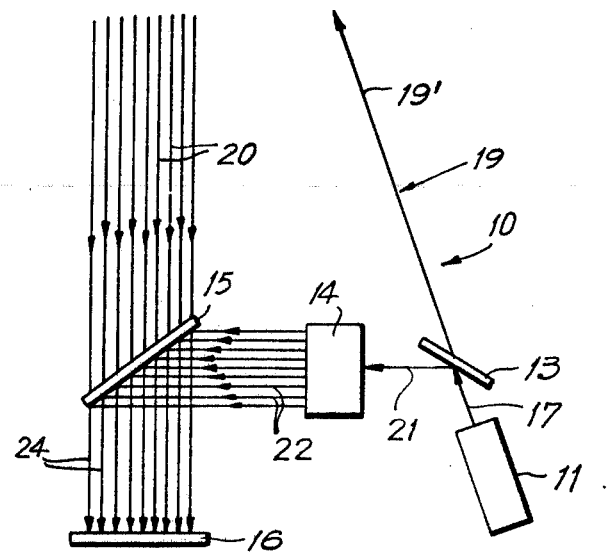
FIG. 1 is a diagrammatic representation of apparatus of the present invention, illustrating the practice of the instant method, for producing a hologram of an object, on a photographic plate, with a single source of coherent light.
Figure 2:
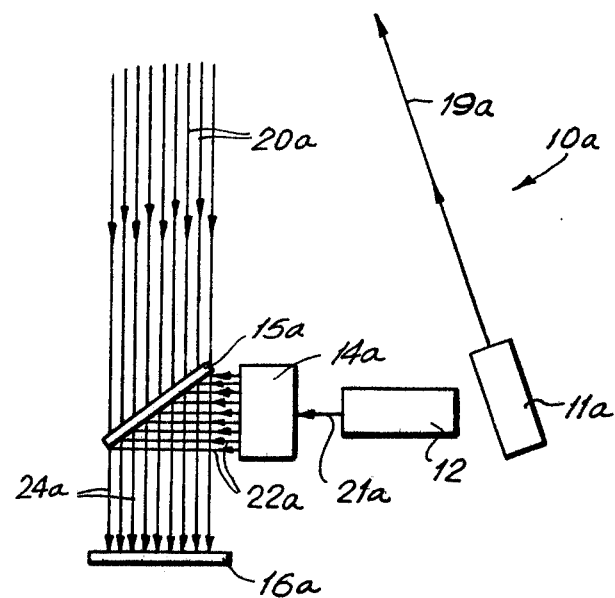
FIG. 2 is a diagrammatic representation of apparatus of the present invention, illustrating an alternate embodiment for making a hologram, on a photographic plate, using two sources of coherent light.
Figure 7:
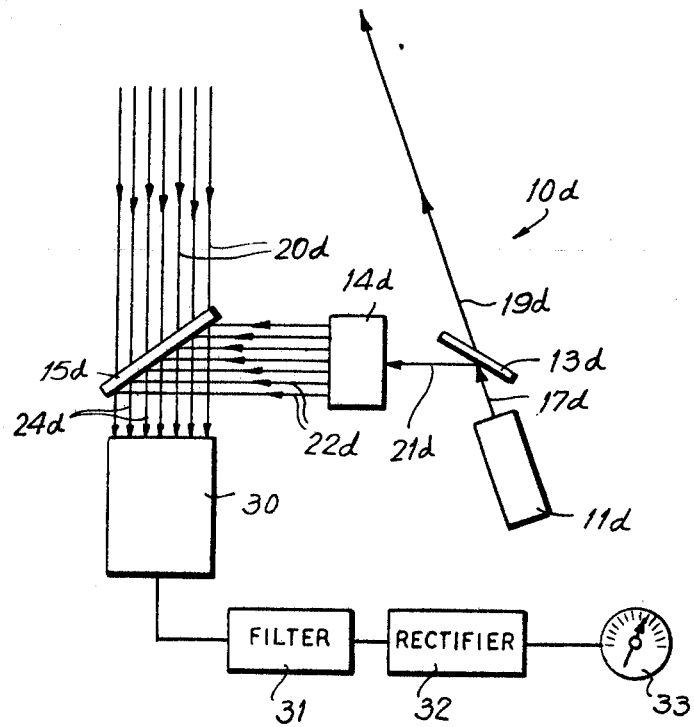
Figure 8:
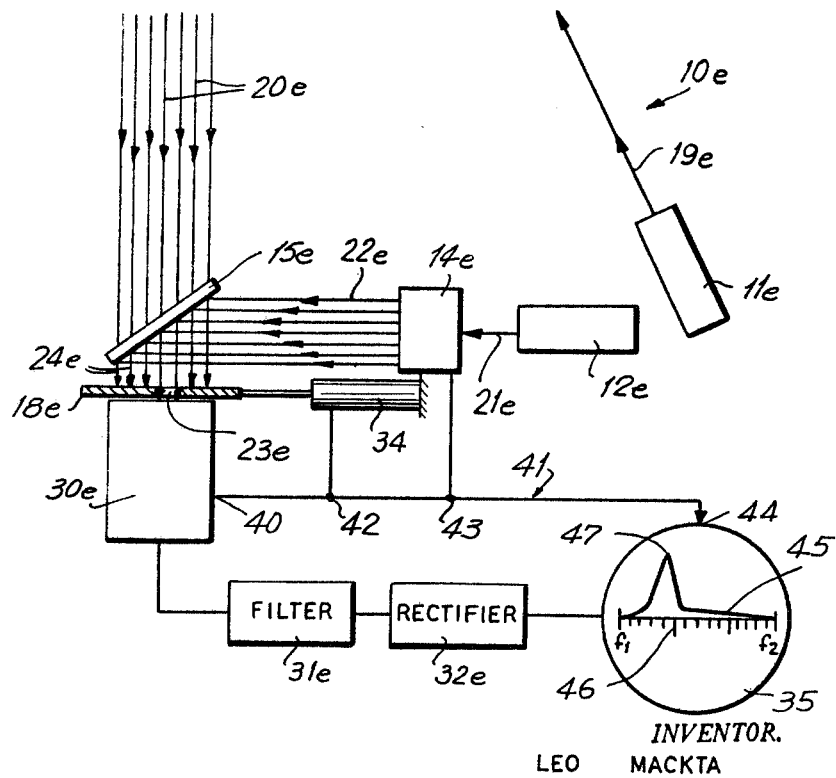

FIG. 7 is a diagrammatic representation illustrating a further embodiment of the apparatus of either FIG. 1 or 4, in combination with a television image orthicon tube and other means as an alternate means for the recording and reading of the hologram; and FIG. 8 is a diagrammatic representation illustrating a further embodiment of the apparatus of either FIG. 2 or 5, in combination with a television image orthicon tube and an oscilloscope as an alternate apparatus for recording and reading the hologram.

Referring now more particularly to the drawings, and particularly to FIG. 1 thereof, there is illustrated therein apparatus for making holograms of moving objects generally designated 10, including a source of coherent monochromatic light 11, a prism or partially silvered mirror 13, means 14 for shifting the frequency of the reflected source beam, a second prism or partially silvered mirror 15 and a photographic film or plate 16.

In the embodiment of FIG. 1, the components 11, 13, 14, 15 and 16 will each be mounted in fixed relationship on a platform or other rigid member (not shown) which may be moved about a variety of axes in order to facilitate tracking of and aiming at the object which is to be holographed.

The beams of light 17 emitting from the source 11 will be directed at the object (not shown) and will be partially reflected by and partially transmitted through the prism or partially silvered mirror 13. The transmitted beams 19 will continue along the path of the arrow 19' toward the object and be reflected therefrom. Some of the reflected beams, returning along the path of the arrows 20, will be transmitted through the prism or partially silvered mirror 15 toward the photographic plate 16. The beams reflected by the mirror 13 will proceed along the path of the arrow 21 toward the frequency shifting apparatus 14, by which apparatus the said beams will be shifted in frequency, as desired. The said frequency shifting apparatus will include means to increase the cross-section and maintain the parallelism of the rays of the output beam 17.

The frequency shifted beam will thence be directed along the path of the arrows 22 toward the mirror 15 to be thereby partially reflected downward toward the photographic plate 16. It is the combination of the beam 20 reflected from the object and transmitted through the mirror 15, and, the beam 22, reflected by the mirror 15, that produces the hologram on the photographic plate 16. This combination beam is designated 24.

The beams which are transmitted, through the mirror 13, toward the object, along the path of the arrow 19, will be reflected from every point of the object toward every point on the photographic film 16. Likewise, the reflected portion 21 of the reference beam 17 will be eventually reflected also to every point on the photographic plate.

Figure 3:
FIG. 3 is a diagrammatic representation illustrating conceptually the appearance, under a normal light, of a hologram made by the apparatus of either FIG. 1 or 2.

If the frequency of the reflected beam is the same as that of the reference beam, then there will be areas of the photographic plate on which the wave fronts of beams are in phase and reinforce one another to produce a stronger illumination, and, areas where the wave fronts of the beams are 180 degrees out of phase so that they annul one another to produce no illumination. For this condition of the same frequency for both beams, these areas will constantly receive this reinforced and annulled illumination during the exposure period and the film will be exposed to this pattern. The resulting hologram will appear much like fingerprints, in an illegible pattern, as illustrated in FIG. 3. The hologram thus produced may be read in a source of mono-chromatic light.

The light source 11 is a source of coherent mono-chromatic light and is, therefore, a source of constant frequency. Consequently, although there has been a shift in the frequency of the beams 20 returning from the object because of the Doppler shift, the frequency of the beams 21 reflected by the mirror 13 will be constant. As a consequence, any combination of the beams 20 and 21 will have no definite fixed relative phase over any portions of their wave fronts. In any small area of the photographic film the illumination will alternate between bright and dark at a rate equal to the beat frequency, or the difference in frequency between the two beams. Therefore, for an exposure time which permits several cycles of this alternation to take place, any area of the film would have a uniform grey exposure. Therefore, a means is provided for effecting a shift in the frequency of beam 21 so as to allow the two beams to produce a stationary pattern rather than producing the uniform graying of the film which would otherwise be produced.

In the practice of this embodiment of the invention, the beam 21 reflected by the mirror 13 will be shifted in frequency by the frequency shifter 14 and a series of holograms made at different frequencies of the reference beam, that is, at different frequencies of the beam 22. The clearest image, that is, the clearest hologram, will be produced by a combination of beams which are of the same frequency. Knowing, therefore, the frequency of the reference beam at which the clearest hologram was produced, one could determine the frequency of the beam 20 reflected from the subject object and be thereby able to determine the velocity of the subject object by any of the known methods for calculating same.

The frequency shifter 14 is here illustrated merely diagrammatically. It is understood, however, that the shifting in the frequency of a laser or coherent light source may be accomplished by various known methods such as parametric tuning. Another alternate apparatus that may be used for the shifting of the frequency of the laser beam is a rotating diffraction grating such as that covered by my U.S. Pat. No. 3,267,284, dated Aug. 16, 1966.

The source 11 in FIG. 1 will generally be a continuous wave source. However, the source 11 may, alternatively, be a pulsed source. That is, the source is actuated periodically to produce a pulsed beam or burst of light.

There would, however, be a limitation where the subject object is at a comparatively great distance and the source of coherent light 11 is a pulsed laser beam. More specifically, when the object is at a great distance, the pulsed beam may return from the object after the end of the pulsed time and, therefore, there will be little or no reference beam with which to combine.

In the instance where the subject object is at a relatively great distance, there are two alternative arrangements.

The first alternative consists of using a low power pulsed laser, that is, a beam of lesser intensity, as the light source 11 in FIG. 1, which source may be triggered at various delayed times, with reference to the initiation of beam 19, so as to serve as the source for the beam that will be transmitted through the mirror 13 toward the object; and again triggered at the proper time to be available as a source for the reference beam 22 to be combined with the beam 20 returning from the subject object.

Another alternative is the use of the embodiment illustrated in the FIG. 2 hereof.

Referring now to FIG. 2, there is illustrated therein an alternate embodiment of apparatus for making holograms of a moving object, generally designated 10a, including a source of coherent light 11a, a second source of coherent light 12, means 14a for shifting the frequency of the light from said second source, a prism or partially silvered mirror 15a and a photographic plate 16a.

In the embodiment of FIG. 2, the apparatus comprising the elements 11a, 12, 14a, 15a and 16a will each be mounted in a fixed relation on a rigid platform which may be moved or rotated about a variety of axes in order to facilitate the tracking of or aiming at the subject object.

The light source 11a may be a high output continuous or pulsed laser emitting a beam of light along the direction of the arrow 19a, at a fixed frequency, toward the subject object (not shown). The light source 12 may be a continuous wave laser emitting a beam of light in the direction of the arrow 21a toward a frequency shifter 14a. The beam 21a will be shifted in frequency by the shifter 14a and the frequency shifted light beam 22a will be partially reflected and partially transmitted by the mirror 15a. The reflected portion of the beam 22a will be reflected downward to combine on the photographic plate 16a, with the beam 20a returning from the subject object, thereby forming a hologram such as is illustrated in FIG. 3. It will thus be seen that however long a period of time is required for the beam, emitted from the source 11a, to reach and return from the subject object, there will always be a reference beam with which it may combine, thus to form a holograph of the subject object. The combined beam is designated 24a.

It will also be recognized that the light source 12 may alternatively be a low power pulsed laser that may be triggered at delayed intervals to coincide with the time of the return of beam 20a reflected from the subject object, thus to combine therewith to form a holograph of the subject object.

As in the embodiment of FIG. 1, a series of holograms will be made, at different frequencies of the reference beam, and the frequency of the reflected beam 20a determined by noting the frequency of the reference beam 22a whereby the clearest hologram was produced.

It will be recognized, here also, that the shifting in frequency of the reference beam 21a may be accomplished by any of the previously mentioned methods. In addition, in the alternate embodiment of FIG. 2, the source 12 and the frequency shifter 14a may be substituted by a source of mono-chromatic light such as a ferrite laser that may be tuned, or frequency shifted, internally as by a magnetic field.

Another application for the apparatus of FIGS. 1 and 2 would be to identify an object moving at a specific or known velocity, that is, to pick it out from a background of different objects moving at different velocities. This may be accomplished by setting the frequency of the reference beam at a value corresponding to the object velocity. Only that object which was moving at a velocity corresponding to the frequency of the reference beam will produce a sharp stationary pattern on the holograph thus produced.

In another alternate embodiment of this invention the method and apparatus of FIGS. 1 and 2 may be supplemented by scanning the area of the hologram recording surface while the frequency of the reference illumination is being varied. The recording surface, which may be a photographic film or plate or photoelectric, is covered or shielded from the beams of light except for a narrow slit through which the illumination may pass through. The slit is swept across the recording surface in the manner of the well known focal plane shutter, during which period the frequency of the reference illumination is varied through a range of frequencies. Under these circumstances, where the recording surface is a photographic film, a thin line of holographic detail will be obtained where the relative radial velocity of the object is such that the Doppler shifted returned illumination corresponds in frequency to that of the reference illumination. Elsewhere on the film there will be a uniform grey, for a reasonable exposure time, as illustrated in FIG. 6.

Since every portion of the hologram has sufficient information for the reproduction of an image of the object; a degraded image of the object moving with the indicated velocity may be reconstructed, from the appropriate velocity line on the hologram, by viewing with monochromatic light. Objects moving with different velocities could be reconstructed from different lines.

Referring now, more specifically, to FIG. 4, there is illustrated therein an alternate embodiment of the apparatus of FIG. 1, generally designated 10b, including a source of coherent monochromatic light 11b, a prism or partially silvered mirror 13b, means 14b for shifting the frequency of the reflected source beam, a second prism or partially silvered mirror 15b, a shutter or shield 18 and a photographic plate 16b.

The components 11b, 13b, 14b, 15b, 18 and 16b will each be mounted in a fixed relation on a platform or other rigid member (not shown) which may be moved about a variety of axes in order to facilitate tracking of and aiming at the object which is to be holographed.

As in the embodiment of FIG. 1, the source beam 17b will be partially reflected by and partially transmitted through the mirror 13b. The transmitted beam 19b will be directed toward the object (not shown). Some of the beam 20b, reflected by the object, will be transmitted through the mirror 15b to be partially blocked from and partially transmitted, through the slit 23 of shield 18, toward the photographic plate 16b. The beams 21b reflected by the mirror 13b will be shifted in frequency, as desired, by the frequency shifter 14b. The frequency shifted beam 22b will be partially reflected downward and likewise partially blocked from and partially transmitted, through the slit 23 of shield 18, toward the plate 16b.

As stated previously, the shield 18 may be a focal plane shutter, or, as illustrated, it may be any suitable shield having a slit 23 and means for a relative movement between the shield 18 and the plate 16b.

The hologram thus produced will appear as illustrated in FIG. 6.

An alternate embodiment of the apparatus of FIG. 2 is illustrated in FIG. 5. Referring now to FIG. 5, there is illustrated therein an alternate embodiment for making holograms of a moving object, generally designated 10c, including a source of coherent light 11c, a second source of coherent light 12c, means 14c for shifting the frequency of the light from said second source, a prism or partially silvered mirror 15c, a shutter or shield 18c and a photographic plate 16c.

The apparatus 10c will be mounted on a platform which may be moved or rotated to facilitate tracking of or aiming at the subject object.

As in the preceding embodiment of FIG. 2, the light source 11c will be a high output laser directing a beam 19c at a fixed frequency, toward the subject object (not shown). The light source 12c will be a continuous wave laser emitting a beam 21c which will be shifted in frequency, as desired, by the shifter 14c. The frequency shifted beam 22c will be partially reflected by and partially transmitted through the mirror 15c. The reflected portion of the beam 22c will combine with the beams 20c reflected from the object and transmitted through the mirror 15c. The combined beams 24c will be partially blocked from plate 16c by the shield or shutter 18c. A holograph, as illustrated in FIG. 6, will be produced on the plate 16c by the combined beams 24c that will pass through the opening 23c of the shield 18c as the plate and shield are moved relatively.

The embodiments of the apparatus of FIGS. 1 and 2 relate to a method of this invention consisting basically of: taking a series of holographs, in sequence, each graph at a slightly different frequency of the reference beam. The clearest, or that graph which reconstructs the clearest view of the subject object, is determined by visual inspection. The corresponding frequency of the reference beam under which that graph was made is converted into relative radial velocity of the subject to the station. This may be determined by the formula:

$$v = \left(\frac{f'}{f} - 1\right) c$$

where:

$f'$ = shifted frequency.
$f$ = original source frequency.
$v$ = relative radial velocity.
$c$ = velocity of light.

The recording surface of FIGS. 1 and 2 is a photographic plate. In the alternative the holographic image may be recorded upon the sensitive cathode of a television type image orthicon tube.

For rapid determination of the velocity of an object, the mosaic of the image orthicon tube is scanned by the electron beam in the conventional manner, although perhaps at a different rate. The electrical output of the tube may be modified by appropriate filter, rectified, and then integrated for an appropriate period, and the magnitude of the output observed. The formation of a stationary image on the photocathode will cause a maximum output to be observed. By correlating this maximum output with the corresponding frequency of the reference illumination, the Doppler shifted frequency reflected from the object and consequently the component of its velocity in a direction radial to the observer, may be determined.

Referring now more particularly to FIG. 7, there is illustrated therein an alternate embodiment of apparatus for determining the velocity of moving objects, generally designated 10d, including a source of monochromatic light 11d, a prism or partially silvered mirror 13d, means 14d for shifting the frequency of the reflected source beam, a second prism or partially silvered mirror 15d, an image orthicon tube 30, a filter 31 to modify the electrical output of the tube, a rectifier 32 to rectify and integrate the output and a meter 33 to observe the magnitude of the output.

The entire apparatus will be suitably mounted for tracking and aiming at the subject object.

Further, it will be apparent that the mirror 13d may be replaced, as in the embodiment of FIG. 2, by a second source of coherent light.

As in the embodiment of FIG. 1, the source beam 17d will be partially reflected by and partially transmitted through the mirror 13d. The transmitted beam 19d will be directed toward the object (not shown). The beam 21d reflected by the mirror 13d will be shifted in frequency, as desired, by the frequency shifter 14d. The frequency shifted beam 22d will be partially reflected and partially transmitted through the mirror 15d. The reflected portion of the beam 22d will combine with the beam 20d reflected from the object and transmitted through the mirror 15d. The combined beams 24d will be recorded by the image orthicon tube 30 and the electrical output of the tube filtered, rectified and integrated, by means of a filter 31 and rectifier 32, as aforesaid, and the output observed on the meter 33. In practice, the frequency is set at a fixed value. The tube is scanned and a reading made. This process is repeated at various frequencies of the reference beam, and the maximum reading noted.

The embodiments of the apparatus of FIGS. 4 and 5 relate to a second alternate method of this invention, providing basically for the additional step of scanning the area of the hologram recording surface while the frequency of the reference illumination is being varied. In the embodiments of FIGS. 4 and 5, the recording surface comprises a photographic plate. In the alternative, the recording surface may be photoelectric mosaic array. If the recording surface is a photoelectric mosaic array (i.e. a television image orthicon tube), the mosaic may be scanned electronically in the conventional manner, with the faster scanning rate in a direction parallel to the shutter slit. The scanning may be performed at the same time as the exposure of the mosaic or at some later time.

The output of the image orthicon tube is filtered and rectified and the maximum value displayed simultaneously with the indication of the amount of deflection of the slow scan. The deflection of the slow scan corresponds to a position of the shutter slit, which in turn will indicate the radial velocity of the object as heretofore explained in the case where a photographic plate is used as the recording surface.

Referring now to FIG. 8, there is illustrated therein another alternate embodiment of apparatus for determining the velocity of moving objects, generally designated 10e, including a source of coherent light 11e, a second source of coherent light 12e, means 14e for shifting the frequency of the light from said second source, a prism or partially silvered mirror 15e, a shutter or shield 18e, means 34 to actuate said shield, an image orthicon tube 30e, a filter 31e, a rectifier 32e and an oscilloscope 35.

The entire apparatus 10e will be suitably mounted for tracking and aiming at the subject object.

Further, it will be apparent that the second source of coherent light 12e may be replaced, as in the embodiment of FIG. 4, by a prism or partially silvered mirror.

As in the embodiment of FIG. 5, the light source 11e will be a laser directing a beam 19e, of fixed frequency, toward the object (not shown). The light source 12e will be a continuous wave laser emitting a beam 21e which may be shifted in frequency, as desired, by the frequency shifter 14e. The frequency shifted beam 22e will be partially reflected by and partially transmitted through the mirror 15e. The reflected portion of the beam 22e will combine with the beam 20e reflected from the object and transmitted through the mirror 15e. The combined beams 24e will be partially blocked from the tube 30e by the shield 18e. A portion of the beam 24e will be transmitted through an opening or slit 23e in the shield 18e and picked up by the tube 30e.

The tube scanner will be synchronized with the shutter or shield actuator 34 and the frequency shifter 14e so that scanning of the tube 30e and the rate of travel of the slit 23e relative the tube and the rate of change in frequency of the reference beam will be in synchronization. The recorded image is filtered and rectified and will be indicated on the oscilloscope, 35, the horizontal deflection of which is a measure of the frequency of the reference beam 22e.

More particularly, the electrical output of the vertical deflection or slower scanning rate of the image orthicon tube 30e is connected at 40 to a synchronization line 41 which is connected at 42 to the shield actuator 34, at 43 to the frequency shifter 14e and at 44 to the sweep of the oscilloscope 35.

The horizontal or faster scanning rate of the tube 30e is utilized to scan the mosaic to determine a pattern. The output of the image orthicon tube is fed through the filter 31e and the rectifier 32e to the oscilloscope 35 and will thus produce the vertical deflection on the oscilloscope image.

The oscilloscope image will move horizontally and be simultaneously vertically deflected by the output of the tube 30e thus producing a pattern as at 45. The face of the oscilloscope may be calibrated as at 46, to indicate, along the horizontal axis, the corresponding frequency of the reference beam 22e. Visual inspection of the oscilloscope image will permit a determination of the peak 47 of the wave pattern 45. The peak 47 will be produced by the sharpest holographic image. Consequently, the frequency of the reference beam at which the sharpest image was produced may be determined by reference to the calibrations 46. The velocity, in a radial direction, of the subject may then be determined by the formula previously set forth or by the example below set forth.

EXAMPLE

Calculation of the Doppler frequency shift to be expected is computed as follows. The change in frequency $\Delta f$ is obtained for radiation scattered back from an object moving with a relative radial velocity $v$.

$$\Delta f = 2v/L$$

where:

L=wave length of the radiation used.
v=velocity in centimeters per second.

For purposes of calculation it is assumed that the wavelength is $5 \times 10^{-5}$ cm., but any other may be used.

For example, 100 miles per hour is approximately 5000 cm./sec., equivalent to a frequency shift of 200 million cycles per second.

The velocity resolution obtainable is approximately proportional to the exposure time of the holograph, the longer the exposure, the better the resolution. Assume many objects with a wide range of relative radial velocities for which a holograph is being made. The shifted reference frequency used in making the holograph corresponds to the frequency received from a particular object of the group, and for this object a sharp stationary pattern is obtained on the recording surface. For other frequencies of radiation received from objects moving with different radial velocities, the pattern which forms on the recording surface alternates with time so that the light parts become dark and the dark parts become light. This happens at a rate which is the difference in frequency between the reference beam and the received beam.

Consider that this frequency difference is 40,000 cycles per second, which for the formula given above for $\Delta f$, corresponds to a relative radial velocity of 1 cm./sec. If the reference frequency corresponded with some velocity of one of the objects of the group, then another object moving with a relative radial velocity which is 1 cm. per second faster or slower, would cause its pattern on the recording surface to alternate 40,000 times per second. While the stationary pattern is being sharply impressed optically on the recording surface, the pattern from the object moving faster or slower is alternating, so that it produces only a constant background level of illumination superimposed over the sharp pattern.

If the exposure time for the holograph is .001 second, the pattern from the object moving 1 cm./sec. faster or slower will alternate 40 times, while that from the object moving with a velocity corresponding to the reference frequency will remain sharp throughout the exposure. An exposure one-fourth as long will still produce 10 alternations, adequate to blur out the undesired pattern, since in the worst case the relative exposures of the desired pattern to the one which is not wanted, is 10:1.

Since the object whose relative radial velocity is to be determined may also have a transverse component of velocity, it is necessary for the apparatus used in the radial velocity measurement to be pointed at the object by a tracking mechanism. Such tracking mechanisms, either manual or automatic, are well known in the field, and may be incorporated in the mounting base of the velocity measuring apparatus by any well-known means.

From the foregoing, it is seen that the present invention provides a method and apparatus for determining the velocity of moving objects, which fully accomplish their intended objects and are well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. Method for determining the velocity of a moving object, comprising the following steps: directing a first source of monochromatic light of constant frequency toward the object, the velocity of which is to be determined; combining the beams of monochromatic light from said first source, reflected by said object, with a second reference source of monochromatic light of varying frequency; exposing said combined beams to the surface of a photo-sensitive receptor; and reading the resultant images to determine the clearest image produced as a result of the synchronization of the frequencies of the reference source and the reflected light, thus, to determine the relative radial velocity of said object to said first source.

2. The method of claim 1 further including the step of: varying the frequency of said reference source prior to combining said reference source with said beams from said first source reflected by said object.

3. The method of claim 2 further including the steps of: making a series of holograms of said object, from said combined beams, at different frequencies of the reference source; and, comparing said series of holograms.

4. The method of claim 2 further including the steps of: partially shielding a photographic film, to be exposed to said combined beams, from said combined beams; and, synchronously moving, relatively, said photographic film and said shielding so as to produce on said film a series of holographic images of said object at different frequencies of said reference source.

5. The method of claim 2 further including the steps of: exposing said combined beams to a photoelectric mosaic array; electronically scanning the input to said photoelectric mosaic array; filtering and rectifying the output from said photoelectric mosaic array; and indicating the resultant electronic image on a meter or the like.

6. The method of claim 2 further including the steps of: partially shielding said combined beams from a photoelectric mosaic array, and partially exposing said combined beams to said photoelectric mosaic array; electronically scanning the input to said photoelectric mosaic array; synchronizing the exposure of said combined beams across the face of said photoelectric mosaic array with the rate of said scanning; filtering and rectifying the output from said photoelectric mosaic array; and indicating the resultant electronic image on an oscilloscope or the like.

7. Method for determining the velocity of a moving object comprising the following steps: directing a source of monochromatic light, of constant frequency, toward the object, the velocity of which is to be determined; partially reflecting and partially transmitting the beam from said source of monochromatic light, said transmitted portion of said beam being directed toward said object, said reflected portion serving as a reference beam; varying the frequency of said reference beam; combining the said transmitted portion of the beam of monochromatic light reflected by said object with the frequency shifted reference beam; exposing said combined beams to the surface of a photo-sensitive receptor; and reading the resulting images to determine the clearest image produces as a result of the synchronization of the frequencies of the reflected beam and the reference beam, thus, to determine the relative radial velocity of said object to said source.

8. The method of claim 7 further including the steps of: making a series of holograms of said object from said combined beams at different frequencies of the reference beam; and comparing said series of holograms.

9. The method of claim 7 further including the steps of: partially shielding a photographic film, to be exposed to said combined beams, from said combined beams; and synchronously moving, relatively, said photographic film and said shielding so as to produce on said film a series of holographic images of said object at different frequencies of the reference beam.

10. The method of claim 7 further including the steps of: exposing said combined beams to a photoelectric mosaic array; electronically scanning the input to said photoelectric mosaic array; filtering and rectifying the output from said photoelectric mosaic array; and indicating the resultant electronic image on a meter or the like.

11. The method of claim 7 further including the steps of: partially shielding said combined beams from a photoelectric mosaic array, and partially exposing said combined beams to said photoelectric mosaic array; electronically scanning the input to said photoelectric mosaic array; synchronizing the exposure of said combined beams across the face of said photoelectric mosaic array with the rate of said scanning; filtering and rectifying the output of said photoelectric mosaic array; and recording the resultant electronic image on an oscilloscope or the like.

12. Method for identifying an object moving at a known velocity comprising the following steps; directing a first source of monochromatic light of constant frequency toward the object to be identified, said frequency corresponding to the velocity of said object; combining the beams of monochromatic light, from said first source, reflected by said object and other surrounding objects, with a second reference source of monochromatic light of a fixed known frequency; exposing said combined beams to the surface of a photo-sensitive receptor; and reading the resultant image, to determine the clearest object image produced as a result of the synchronization of the reference source and the reflected light, thus, to distinguish the object to be identified from other objects moving at different velocities.

13. Method for identifying an object moving at a known velocity, comprising the following steps: directing a source of monochromatic light, of constant frequency, toward the object to be identified, said frequency corresponding to the velocity of said object; partially reflecting and partially transmitting the beam from said source of monochromatic light, said transmitted portion of said beam being directed toward said object, said reflected portion serving as a reference beam; combining the said transmitted portion of said source beam, reflected by said object and other surrounding objects, with the said reference beam; exposing said combined beams to the surface of a photo-sensitive receptor; and reading the resultant image, to determine the clearest image produced as a result of the synchronization of the frequencies of the reference source and the reflected light, thus, to distinguish the object to be identified from other surrounding objects moving at different velocities.

14. Apparatus for determining the velocity of moving objects, comprising: a first source of monochromatic light of constant frequency; means to direct the beam from said first source toward the object, the velocity of which is to be determined; a second reference source of monochromatic light of variable frequency; means to transmit the beam emanating from said first source and reflected by said object, and to reflect the beam from said reference source thus to facilitate the combining of said beams; a photo-sensitive receptor; means to expose said combined beams to said photo-sensitive receptor to determine the clearest image produced as a result of the synchronization of the frequencies of the reference source and the reflected light; and means for tracking the object, the velocity of which is to be determined; all of said components being mounted in adjustable fixed relationship to said tracking means.

15. Apparatus for determining the velocity of moving objects, according to claim 14; further including means, positioned between said reference source and said means for transmitting and reflecting light beams, for varying the frequency of said reference source; and wherein said reference source is a source of constant frequency.

16. Apparatus for determining the velocity of moving objects, according to claim 15; wherein said photo-sensitive receptor is a photographic plate.

17. Apparatus for determining the velocity of moving objects, according to claim 16; further including means for partially shielding from and partially exposing, said combined beams, to said photographic plate.

18. Apparatus for determining the velocity of moving objects, according to claim 17; further including means for synchronizing the exposure, of portions of said photographic film to said combined beams, with the rate of change of frequency of said reference source beam.

19. Apparatus for determining the velocity of moving objects, according to claim 15; wherein said photo-sensitive receptor is a photoelectric mosaic array.

20. Apparatus for determining the velocity of moving objects, according to claim 15; wherein said photo-sensitive receptor is an image orthicon tube; and further including means to modify the output of said tube; means to rectify and integrate the said output; and means to observe the magnitude of said output.

21. Apparatus for determining the velocity of moving objects, according to claim 20; further including means for scanning said tube; means for synchronizing the exposure, of portions of said image orthicon tube to said combined beams, with the rate of scanning of said tube and the rate of change of frequency of said reference source beam.

22. Apparatus for determining the velocity of moving objects, comprising: a source of monochromatic light, of constant frequency; first means for partially reflecting and partially transmitting the beam from said source, the transmitted portion of said beam being directed toward the object, the velocity of which is to be determined, the reflected portion of said source beam serving as a reference beam; means for varying the frequency of said reference beam; second means to transmit the beam transmitted by said first means for reflecting and transmitting, and, to reflect the frequency-shifted reference beam, thus to facilitate the combining of said beams; a photo-sensitive receptor; means to expose said combined beams to said photo-sensitive receptor to determine the clearest image produced as a result of the synchronization of the reference beam and the reflected beam; and means for tracking the said object; all of said components being mounted in adjustable fixed relationship to said tracking means.

23. Apparatus for determining the velocity of moving objects, according to claim 22; wherein said photo-sensitive receptor is a photographic plate.

24. Apparatus for determining the velocity of moving objects, according to claim 23; further including means for partially shielding from and partially exposing, said combined beams, to said photographic plate.

25. Apparatus for determining the velocity of moving objects, according to claim 24; further including means for synchronizing the exposure, of portions of said photographic film to said combined beams, with the rate of change of frequency of said reference source beam.

26. Apparatus for determining the velocity of moving objects, according to claim 22; wherein said photo-sensitive receptor is a photoelectric mosaic array.

27. Apparatus for determining the velocity of moving objects, according to claim 22; wherein said photo-sensitive receptor is an image orthicon tube; and further including means to modify the output of said tube; means to rectify and integrate the said output; and means to observe the magnitude of said output.

28. Apparatus for determining the velocity of moving objects, according to claim 27; further including means for scanning said tube; means for synchronizing the exposure, of portions of said image orthicon tube to said combined beams, with the rate of scanning of said tube and the rate of change of frequency of said reference source beam.

29. Apparatus for identifying an object moving at a known velocity, according to claim 16.

30. Apparatus for identifying an object moving at a known velocity, according to claim 23.

References Cited

UNITED STATES PATENTS

| 3,267,284 | 8/1966 | Mackta. |
| 3,284,799 | 11/1966 | Ross. |
| 3,409,369 | 11/1968 | Bickel _____ 356—28 |

OTHER REFERENCES

G. Bierson et al.: Requirements of a Coherent Laser Pulse-Doppler Radar, July 2, 1962, Proceedings of the IEEE, pp. 202–209.

B. P. Hildebrand et al.: Interferometric Measurements Using Waveforms Reconstruction Technique, January 1966, Applied Optics, vol. 5, No. 1, pp. 172–173.

RODNEY D. BENNETT, JR., Primary Examiner

J. P. MORRIS, Assistant Examiner